United States Patent [19]

Noker

[11] 3,978,494

[45] Aug. 31, 1976

[54] STYLUS ASSEMBLY

[75] Inventor: Alvin John Noker, Bountiful, Utah

[73] Assignee: Sperry Rand Corporation, New York, N.Y.

[22] Filed: Nov. 13, 1975

[21] Appl. No.: 631,633

[52] U.S. Cl. .............................. 346/139 C; 219/216

[51] Int. Cl.[2] .............................. G01D 15/10

[58] Field of Search ........ 219/216; 346/74 S, 74 SB, 346/76 R, 139 C

[56] References Cited

UNITED STATES PATENTS

| | | | |
|---|---|---|---|
| 2,966,726 | 1/1961 | Gallentine et al. | 346/139 C X |
| 2,966,727 | 1/1961 | Gallentine et al. | 346/139 C X |
| 3,340,381 | 9/1967 | Best | 346/76 X |
| 3,478,191 | 11/1969 | Johnson et al. | 219/216 |
| 3,578,946 | 5/1971 | Colello | 219/216 |
| 3,862,394 | 1/1971 | Lane | 346/139 C X |

*Primary Examiner*—George H. Miller, Jr.
*Attorney, Agent, or Firm*—Thomas P. Murphy; Thomas J. Nikolai; Marshall M. Truex

[57] ABSTRACT

A structure and method of manufacture of a disposable stylus for use as a writing tip in a printer using electrosensitive papers. The stylus comprises a plurality of conductive wires embedded in a Teflon ribbon which is cut away exposing the ends and a portion of the middle. The ribbon is wrapped around a plastic form to provide two writing tips and a connector in one integral structure.

9 Claims, 7 Drawing Figures

STYLUS ASSEMBLY

BACKGROUND OF THE INVENTION

In a printer such as the type using an electrosensitive print medium, various types of print heads are used. These heads essentially comprise a plurality of electrode tips which according to the alphanumeric symbols to be printed burn patterns of dots into the paper as the head is swept past the print medium.

Many of these print heads comprise elaborate multipart devices which are costly to manufacture, maintain or replace.

The present invention contemplates a disposable multihead stylus comprising a plurality of wires made of tungsten or a similar metal wrapped on a form whereon the two exposed ends each form a writing tip for contacting the electrosensitive paper at one end of the stylus and the middle portion of the wires form a connector at the other end of the stylus for plugging into the stylus carrier without the need of an intervening connector. Thus, the stylus of the present invention is an integral writing head and connector which is easily made and which uses no solder and no separate connectors. It has two or possibly more writing tips for increasing the life of the stylus. It's inexpensive and quick and easy replacement makes it effectively a disposable item.

OBJECTS

An object of the present invention is to provide a stylus for printing on electrosensitive paper which in a single integral unit comprises at least one writing tip and a connector.

Another object of the present invention is to provide an easily replaceable stylus having two sets of writing tips.

A further object of the present invention is to provide a disposable stylus integrally made to have two sets of writing tips and a connector.

Yet another object of the present invention is to provide an inexpensive, easily manufactured, easily replaceable stylus comprising in one integral unit at least two writing heads and a connector for selectively connecting either head to source of write data.

Other objects and many of the attendant advantages of the present invention will become more apparent with reading the following specification in conjunction with the drawing.

DESCRIPTION OF THE INVENTION

Figure 4:
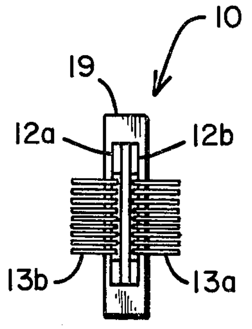
FIG. 4 is a left side view of the stylus shown in FIG. 1.
Figure 1:
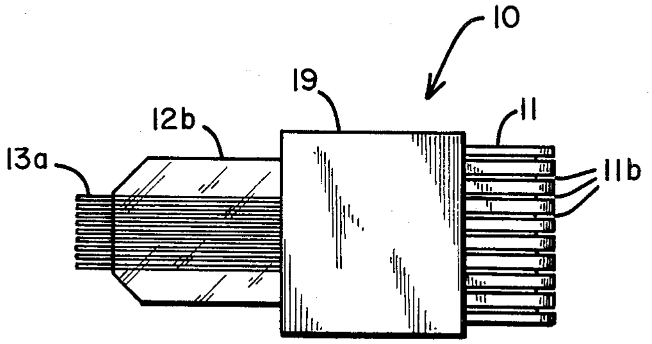
FIG. 1 illustrates a top view of the stylus of the present invention.

Referring now more particularly to FIG. 1, there is shown the stylus 10 of the present invention. The stylus 10 comprises a form 11 which is made of an insulating plastic such as phenylene oxide ("Noryl" by G.E.). The right-hand end 11*a* of the form 11 is rounded. A plurality of grooves 11*b* are formed in the opposing flat surfaces of the form and extend around the end 11*a*. The grooves at the end 11*a* are sufficiently recessed so that when wires are mounted in the grooves 11*b*, they are not exposed. Whereas, the grooves in the flat surfaces are sufficiently shallow that the wires protrude one-half their diameter to permit electrical connection when the form 11 is inserted into an electrical plug disposed, e.g., on the stylus carrier (not shown).

The wires used in a preferred embodiment in the stylus of the present invention are tungsten of a relatively small gauge, e.g., 0.0070 diameter. Tungsten wire is selected because of its high resistance to temperature abrasion, and electrical erosion. Since tungsten is extremely difficult to solder or plate, the present stylus combines in one unit the writing tips and connector wherein, as will be seen more fully herein below, no solder joints are required.

Prior to fabrication of the stylus, tungsten wires are embedded in an insulating thin plastic ribbon such as Teflon with portions of the ribbon removed.

Figure 5:
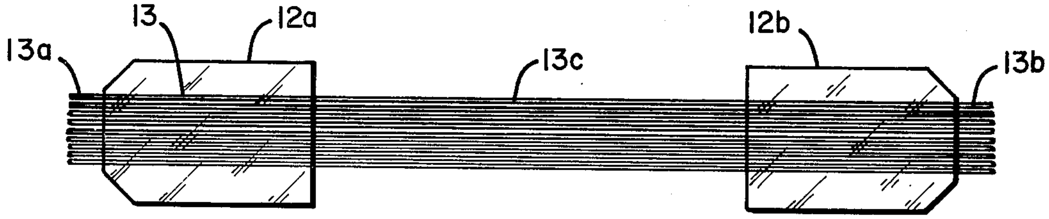
FIG. 5 is a top view of the stylus wires embedded in a plastic ribbon with portions of the ribbon removed prior to bending.

FIG. 5 shows the structure where the Teflon ribbon has been removed from the wires. More precisely there are shown two portions of Teflon ribbon 12*a* and 12*b*. Each of these portions 12*a* and 12*b* has embedded therein a plurality of tungsten wires 13. The actual number of tungsten wires used is dependent on the number of matrix dots which a printer using the stylus requires. In a practical embodiment, the number of tungsten wires 13 used is nine. This permits a vertical line to have a maximum of nine dots burnt in the aluminized paper which has been found to be more than sufficient for clarity of print.

As seen in FIG. 5, the Teflon ribbon has been removed at each end from a short length of tungsten wires 13*a* and 13*b*. These ends 13*a* and 13*b* of wires form the writing tips of the stylus. It should be noted that the embedding of the wires 13 in a ribbon assures a fixed spatial relationship of the wires. The wires are spaced 0.014 ± 0.002 from each other. This spacing has been found to be optimal in producing distinct dots on the sensitized paper and in prevention of arcing or other electrical interference between the wires.

In addition the position of the ribbon portions 12*a* and 12*b* provide for the desired rigidity of the ends 13*a* and 13*b* when sliding in the writing position across the sensitized paper.

As also seen in FIG. 5, a relatively long length 13*c* of the tungsten wires is exposed between the portions 12*a* and 12*b* of the Teflon ribbon.

Figure 6:
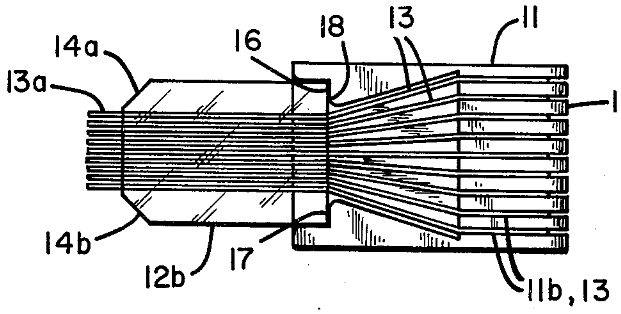
FIG. 6 is a top view similar to FIG. 1 with the sleeve removed.

Referring to FIG. 6, there is shown the form 11 having the tungsten wires 13 disposed in their respective grooves. The structure of FIG. 6 comprises the embedded tungsten wires of FIG. 5 bent in the middle and fanned out as shown in FIG. 6 to fit the grooves 11*b* of the form 11. As aforesaid the exposed length 13*c* of the tungsten wire is wrapped around the form 11 and disposed in the grooves 11*b* such that the wires slightly protrude beyond the grooves 11*b* in the flat surfaces so that electrical contact may be made when the end of the stylus 10, which is itself a connector, is inserted into a connector on the stylus carrier. The grooves 11*b* in the end 11*a*, on the other hand, are more deeply recessed so that the tungsten wires 13 are not exposed. This eliminated possible interference or obstruction when the form 11 is inserted into a connector.

As also can be seen in FIG. 6 the end 13*b* which with its counterpart 13*a* (not shown in FIG. 6) comprise the writing tips of the stylus. The portions 12*a* and 12*b* of the Teflon ribbon may have their corners cut away, e.g., at 14*a* and 14*b*. However, this is not essential to the invention.

Figure 2:
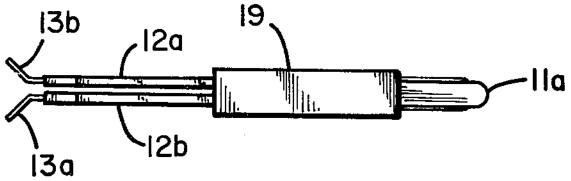
FIG. 2 shows a side elevational view of the stylus of the present invention.

As shown in FIG. 2, the tips 13*a* and 13*b* are bent outwardly at an angle which permits the selected writing tip to engage the sensitized paper. In a practical embodiment the writing tips 13*a* and 13*b* are bent at an angle of approximately 55° which permits unobstructed engagement of the selected writing tip with the paper when the stylus is held by a stylus carrier at an angle of 15° relative to the surface of the sensitized paper.

Figure 3:
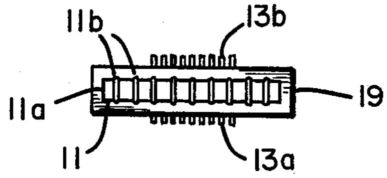
FIG. 3 is a right side view of the stylus shown in FIG. 1.

FIGS. 2 and 3 show the relative distance that the writing tips 13*a* and 13*b* extend from the stylus.

Referring again to FIG. 6 and FIG. 7 the mounting form 11 and particularly its relationship to the tungsten wire 13 and ribbon portions 12*a* 12*b* is shown.

As previously mentioned the form itself comprises grooves 11*b* into each of which one of the tungsten wires 13 is inserted.

Prior to insertion the tungsten wires 13 are fanned outward and then bent at an appropriate angle so that each wire is aligned with its respective groove 11*b* for easy insertion.

Figure 7:
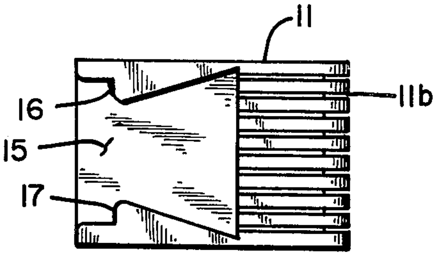
FIG. 7 is a top view of the mounting form used in the present invention.

The form 11 has a recessed portion 15 which is shaped to accommodate the wires 13 as they extend from the ribbon portions 12*a* and 12*b*. While only one side of the form is shown in FIG. 7, it should be noted that the other side is identical in structure.

The form 11 has formed therein abutments 16 and 17. As shown in FIG. 6 the edge 18 of ribbon portion 12*b* abuts against abutments 16 and 17. The recessed portion 15 has a depth substantially equal to the thickness of the ribbon portion 12*b* and has a width slightly greater than that of ribbon portion 12*b* so that when the end of ribbon portion 12*b* is within the recessed portion 15 with its edge 18 against the abutments 16 and 17, the structure of FIG. 6 is relatively rigid. It should be noted that ribbon portion 12*a* fits into a like recess and abutment arrangement on the other side of form 11 (not shown).

As seen in FIGS. 1, 2, 3 and 4, a sleeve 19 is slipped onto the stylus 10 and fixed there, e.g., by an appropriate plastic cement. This sleeve 19 is made of an insulating plastic material and serves three purposes. First it provides further rigidity of the structure. Second it covers a portion of the tungsten wires to aid in maintaining their spatial relationship and reduces the possibility of electrical shock when the stylus is being changed. Third, it is useful when the stylus is plugged into a connector to aid in a mechanically secure and accurate fit which also insures a proper electrical connection of the tungsten wires within the connector. In addition the sleeve 19 forms a mechanical latch to hold the stylus 10 in the connector arm.

While it forms no part of this invention the printer environment in which the stylus 10 of the present invention is used will be briefly discussed to provide a better understanding of the present invention.

The printer utilizes rolls of electrosensitive paper such as paper with an aluminum coating on film. The paper is passed over a platen which is electrically grounded.

The connector end of the stylus 10 is plugged into a connector on a stylus carrier which is connected to the electronic decoding circuitry of the printer which converts input data into signals or voltages which are pulsed into the tungsten wires 13 in accordance with the character to be printed.

As the carriage passes transversely over the paper, one of the writing tips 13*a* and 13*b* passes contiguously over the sensitized paper creating a line of print. The print is caused because as selected ones of the wires 13 are energized, each causes a hole to be burnt through the aluminized surface into a black dye layer on the paper due to the completed electrically circuit between a selected one or ones of the wires 13 the sensitized paper and the grounded platen.

Since the stylus has two writing tips each having a common connection to the wires wrapped around the form 11 which is effectively a connector, either writing tip 13*a* or 13*b* may be used for printing. When one writing tip becomes worn, the stylus may be unplugged from the stylus carrier, reversed and replugged to permit use of the other tip. This doubles the life of the stylus.

In addition since the stylus is so economical to make and so easily replaced, it is essentially a disposable item.

Other modifications of the present invention are possible in the light of the above description and the illustrations of the present invention set forth should not be construed as placing limitations on the present invention other than those limitations contained in the claims which follow.

What is claimed is:

1. A stylus for writing on electrosensitive paper, comprising in combination;

support means a plurality of electrically conductive wires wrapped about said support means to form at least one writing tip extending from one end of the support means and an electrical connector at the other end of said support means, said support means comprising a relatively thin form with opposing flat surfaces having a plurality of grooves formed around one end and extending substantially halfway down each flat surface thereof for receiving individual ones of said plurality of wires.

2. A stylus according to claim 1, wherein said plurality of wires are embedded at each end in an electrically insulating ribbon for holding the wires in closely spaced parallel relationship leaving the ends of said wires and a length of the middle of said wires exposed.

3. A stylus according to claim 2, wherein said support means includes recessed portions in said flat surfaces at the end opposite from that containing said grooves, each of said recessed portions having abutments disposed at each side, said plurality of wires being wrapped around said form with part of each of the exposed lengths of wires disposed in a respective groove in said form and the remainder of the exposed middle length of wires housed in said recessed portions.

4. A stylus according to claim 3, wherein each of said ribbons are disposed in said recessed portions with their inner ends disposed against said abutments.

5. A stylus according to claim 4 wherein, a sleeve is recessed on said form covering the part of the middle length of the exposed wires disposed in said recessed portions and a portion of the inner length of said ribbons.

6. A stylus according to claim 5, wherein said form, said ribbons and said sleeve are all made of a plastic insulating material.

7. A stylus according to claim 6, wherein said wires disposed in said grooves protrude slightly from said grooves in the opposing flat surfaces of said form to permit electrical contact therewith when said stylus is plugged into a compatible electrical connector.

8. A stylus according to claim 7, wherein the ends of said plurality of wires extending from said ribbons are bent outwardly to form writing tips.

9. A stylus according to claim 8, wherein said wires are made of tungsten.

* * * * *